(12) United States Patent
Bertsch

(10) Patent No.: US 7,441,536 B2
(45) Date of Patent: Oct. 28, 2008

(54) INTERNAL COMBUSTION ENGINE WITH DIRECT FUEL INJECTION

(75) Inventor: Dietmar Bertsch, Aspach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/800,007

(22) Filed: May 1, 2007

(65) Prior Publication Data

US 2007/0261666 A1 Nov. 15, 2007

Related U.S. Application Data

(63) Continuation-in-part of application No. PCT/EP2005/011324, filed on Oct. 21, 2005.

(30) Foreign Application Priority Data

Nov. 3, 2004 (DE) .................... 10 2004 053049.1

(51) Int. Cl.
*F02B 3/00* (2006.01)
*F02B 5/00* (2006.01)
(52) U.S. Cl. ........................ 123/298; 123/305
(58) Field of Classification Search ................ 123/294, 123/295, 298, 299, 301, 305
See application file for complete search history.

(56) References Cited

U.S. PATENT DOCUMENTS

| | | | |
|---|---|---|---|
| 5,724,937 A | 3/1998 | Bezner et al. | |
| 5,921,215 A * | 7/1999 | Wirth et al. | 123/298 |
| 5,979,399 A * | 11/1999 | Piock et al. | 123/301 |
| 6,543,408 B1 * | 4/2003 | Ernst et al. | 123/295 |
| 6,575,132 B1 * | 6/2003 | Ernst et al. | 123/295 |
| 6,629,519 B1 * | 10/2003 | Bertsch et al. | 123/305 |
| 6,725,828 B1 | 4/2004 | Han et al. | |
| 6,748,917 B1 * | 6/2004 | Hoffmann et al. | 123/295 |
| 2002/0002963 A1 | 1/2002 | Bertsch et al. | |

FOREIGN PATENT DOCUMENTS

| | | |
|---|---|---|
| DE | 199 11 023 | 9/2000 |
| DE | 100 12 969 | 11/2001 |
| EP | 1 538 317 | 6/2005 |
| WO | WO 2004/007944 | 1/2004 |

* cited by examiner

*Primary Examiner*—John T Kwon
(74) *Attorney, Agent, or Firm*—Klaus J. Bach

(57) ABSTRACT

In an internal combustion engine with at least one cylinder in which a combustion space is delimited between a piston and a cylinder head, with a fuel injector having an outwardly opening injection nozzle arranged in the combustion space for injecting fuel in the form of a hollow cone into the combustion space, and a spark plug mounted in the cylinder head and having electrodes arranged outside the hollow fuel cone generated by the injection nozzle, into which the electrodes of the spark plug project, the cylinder has a bore diameter (D) dimensioned such that, at an ignition time point of the internal combustion engine, a ratio dmR/D of the mean diameter (dmR) of the fuel boundary vortex (10) to the cylinder bore diameter (D) is in a range of 0.08 to 0.2, in particular of 0.1 to 0.12.

12 Claims, 1 Drawing Sheet

INTERNAL COMBUSTION ENGINE WITH DIRECT FUEL INJECTION

This is a Continuation-In-Part Application of pending International Patent application PCT/EP2005/011324 filed Oct. 21, 2005 and claiming the priority of German Patent application 10 2004 053 049.1 filed Nov. 3, 2004.

BACKGROUND OF THE INVENTION

The invention relates to a spark-ignition internal combustion engine with direct fuel injection comprising a cylinder with a cylinder head and a piston between which a combustion chamber is formed with a spark plug mounted in the cylinder head and including electrodes disposed in the combustion chamber and a fuel injector mounted in the cylinder head and extending into the combustion chamber for injecting fuel into the combustion chamber in the form of a hollow cone.

When spark-ignition internal combustion engines are operated with direct injection, injection nozzles are used which are intended to ensure improved combustion, and low emissions as a result of the formation of a defined fuel jet pattern. Particularly in jet-managed combustion methods, outwardly opening injection nozzles are used in order to optimize the fuel injection pattern. The jet pattern generated by such injection nozzles is in this case important for the combustion properties of the mixture formed. To avoid misfiring, the design of the combustion space is critical, since a virtually permanent jet pattern is not always ensured during operation. This is attributable to the fact that, when the engine is in operation, jet patterns are subjected to slight deviations from an ideal jet pattern in spite of the injection nozzles being manufactured within accepted tolerances.

It is the object of the present invention to provide a spark-ignition internal combustion engine with direct fuel injection, in which mixture formation and combustion in the combustion chamber are improved.

SUMMARY OF THE INVENTION

In an internal combustion engine with at least one cylinder in which a combustion space is delimited between a piston and a cylinder head, with a fuel injector having an outwardly opening injection nozzle arranged in the combustion space for injecting fuel in the form of a hollow cone into the combustion space, and a spark plug mounted in the cylinder head and having electrodes arranged outside the hollow fuel cone generated by the injection nozzle, into which the electrodes of the spark plug project, the cylinder has a bore diameter (D) dimensioned such that, at an ignition time point of the internal combustion engine, a ratio dmR/D of the mean diameter (dmR) of the fuel boundary vortex (10) to the cylinder bore diameter (D) is in a range of 0.08 to 0.2, in particular of 0.1 to 0.12.

As a result of the dimensions or ratios provided according to the invention, when the internal combustion engine is in operation a fuel jet structure or a fuel distribution adapted to the cylinder bore is obtained, by means of which the formation of an ignitable mixture in the vicinity of the electrodes of the spark plug is improved. Reliable ignition without misfirings thus becomes possible. The effects surprisingly achieved at the ratios according to the invention are obtained predominantly due to favorable coordination between the required distribution of the fuel particles in the boundary vortex in relation to the bore diameter.

Preferably, at the ignition time point a ratio of the mean diameter of the boundary vortex to the boundary vortex center is in a range of between 0.25 and 1.5, preferably of between 0.5 and 1.1. This brings about a notably rapid fuel distribution within the boundary region of the vortex, so that a rapid intermixing of the fuel with the air is achieved.

According to a further refinement of the invention, the hollow fuel cone has at the time of ignition a toroidal vortex diameter, a ratio of the toroidal vortex diameter to the bore diameter lying in a range of between 0.2 and 0.4 or of between 0.25 and 0.35. The injected fuel quantity is thus distributed uniformly within the hollow cone and intermixing of fuel with the combustion air is intensified.

Preferably, the hollow fuel cone has a maximum diameter of the fuel cloud, at the ignition time point a ratio of the maximum diameter to the bore diameter in a range of 0.35 to 0.65 or of 0.45 to 0.55. According to the invention, in the proposed range, certain flow conditions depending on the bore diameter arise and provide in the boundary vortex region for a rapid and sufficient intermixing of the fuel droplets with the combustion air.

The piston has a recess with a certain recess diameter selected so that, at the ignition time point, a ratio of the maximum diameter of the fuel cloud to the recess diameter is between 0.5 and 1.5 or preferably between 0.8 and 1.2. Turbulent flow movements between the hollow fuel cone and the piston surface are thus achieved, which with an injection of the fuel in the compression stroke leads to a well-defined fuel/air mixture, without the mixture thinning out in the boundary regions and leading to increased exhaust gas emissions.

At the ignition time point a ratio of the maximum depth of penetration of the hollow fuel cone to the bore diameter lies in a range of 0.1 to 0.5 or of 0.2 to 0.3. This ensures a uniform and controlled guidance of the fuel particles along the hollow cone. This then leads in a controlled manner to a greater intermixing of the fuel with the combustion air. Furthermore, a sufficient contact area with the combustion air for fuel droplets swirled around at the outer region of the hollow cone is made available in tune with the bore diameter.

The invention will become more readily apparent from the description of actual exemplary embodiments of the invention presented below on the basis of the accompanying drawings:

DESCRIPTION OF PARTICULAR EMBODIMENTS

Figure 1:
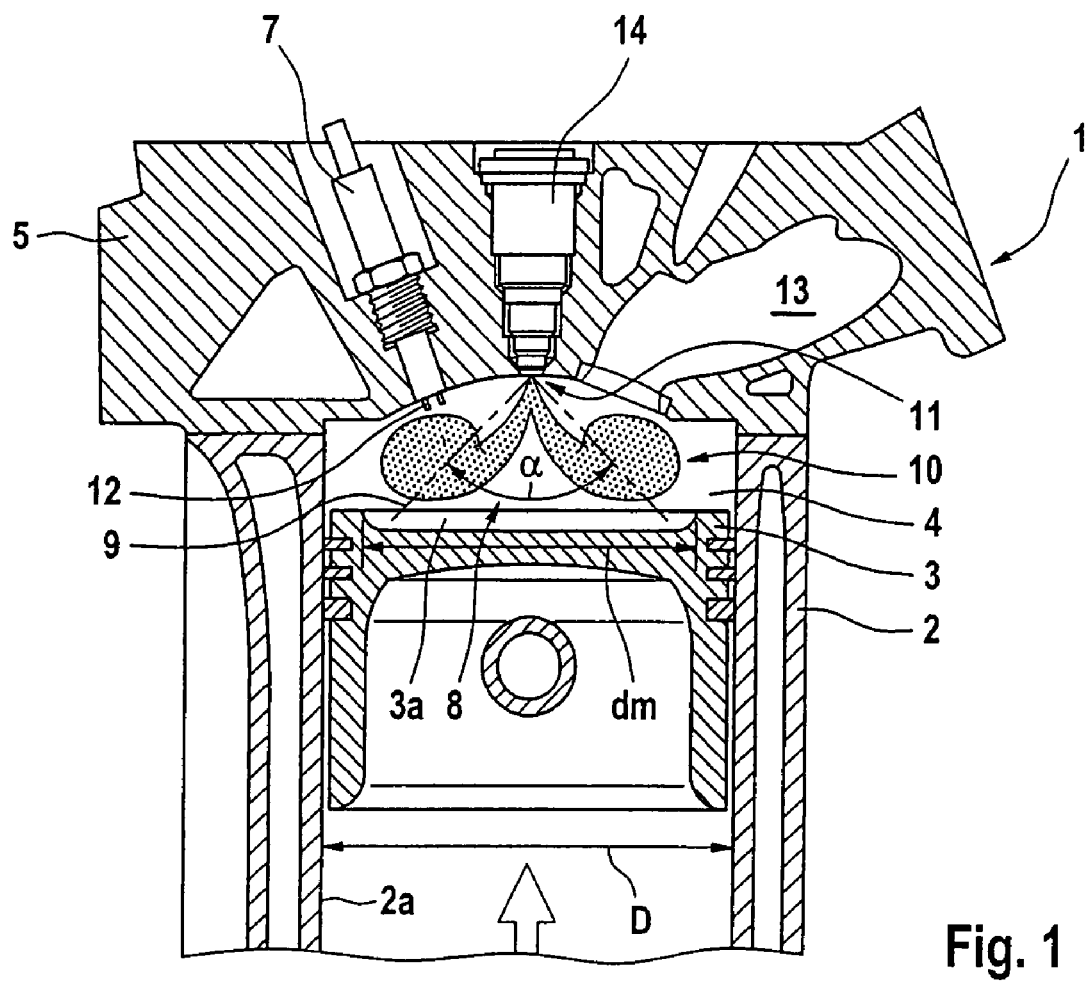
FIG. 1 shows in a sectional illustration, a cylinder of a direct-fuel-injection spark-ignition internal combustion engine.

FIG. 1 shows a cylinder 2 of a spark-ignition internal combustion engine 1 with direct injection, in which a combustion space 4 is delimited between a piston 3 and a cylinder head 5. The internal combustion engine comprises, for each combustion space 4, at least one inlet valve, at least one outlet valve, a fuel injector 14 and a spark plug 7. Inlet and outlet ducts are provided in the cylinder head 5, only one inlet duct 13 being depicted in FIG. 1. A piston recess 3a is preferably provided in the piston 3. The cylinder 2 has a cylinder bore 2a with a bore diameter D. The internal combustion engine 1 illustrated in FIG. 1 operates on the four-stroke principle, but, the internal combustion engine may likewise be designed as a spark-ignition two-stroke internal combustion engine with direct fuel injection.

In the first stroke, combustion air is supplied to the combustion space 4 through the inlet duct 13, the piston 3 moving downwardly to a bottom dead center. In the following compression stroke, the piston 3 moves upwardly from the bottom dead center to a top dead center position, the fuel being injected into the combustion space during the compression stroke in a stratified charge mode of the internal combustion engine 1. When the piston is in the region of the top dead center, a fuel/air mixture formed is ignited by means of the spark plug 7, the piston 3 moving then in a downward direction to the bottom dead center position. In the last stroke, the piston 3 moves upwardly again to the top dead center while expelling the exhaust gases from the combustion space 4.

According to the present exemplary embodiment, the internal combustion engine 1 is operated in such a way that, in the lower and medium rotational speed and load range, the engine is operated in the stratified charge mode and in the upper load range in the homogeneous charge mode. In particular, in the stratified charge mode, a jet-managed combustion method, as it is known, is carried out. In the stratified charge mode, the injection of the fuel takes place with a fuel injection pressure of about 180 bar to 220 bar at a time in point at which a back pressure in the combustion space amounts to between 8 bar and 20 bar, preferably between 10 and 16 bar. This corresponds, in the present exemplary embodiment, to a crank angle range of between 40° and 10° before top dead center. The crank angle range given here may be different depending on the type of construction and of operation of the internal combustion engine and depending on the load point of the back pressure range or cylinder pressure range provided.

In such a jet-guided combustion method, an outwardly opening injection nozzle 11 is preferably used, by means of which a hollow fuel cone 8 with an angle α of between 70° and 100°, preferably of between 80° and 90°, is generated. Since the hollow fuel cone 8 impinges onto combustion air compressed in the combustion space 4, a toroidal boundary vortex 10 is formed in the combustion space 4 in such a way that an ignitable fuel/air mixture is formed in the region of the electrodes 12 of the spark plug 7. The spark plug 7 is arranged in such a way that the electrodes 12 of the spark plug 7 project into the boundary vortex 10 formed, the spark gap lying outside a surface area 9 of the fuel cone 8 during fuel injection. As a result, the electrodes 12 of the spark plug 7 are scarcely wetted with fuel.

In order to achieve optimal ignition conditions in the region of the boundary vortex prevailing at the ignition point in time at the electrodes 12 of the spark plug 7, it is necessary that a virtually uniform boundary vortex 10 is formed. That is to say, the boundary vortex 10 formed should have a uniform fuel distribution over the entire region, so that an ignitable fuel/air mixture is present at the ignition point in time in the region of the electrodes.

The present invention is aimed at coordinating the injection of the hollow fuel cone 8 introduced into the combustion space 4 with the combustion space conditions and, in particular, with the cylinder bore 2a by means of a combustion space configuration according to the invention. Thus, the fuel quantity is distributed optimally in the outer region of the boundary vortex 10 by virtue of the invention and at the same time intermixed intensively with the compressed combustion air. Furthermore, with the aid of the proposed combustion space configuration, a possible occurrence of low-fuel zones in the electrode region is counteracted, misfiring does not occur.

Figure 2:
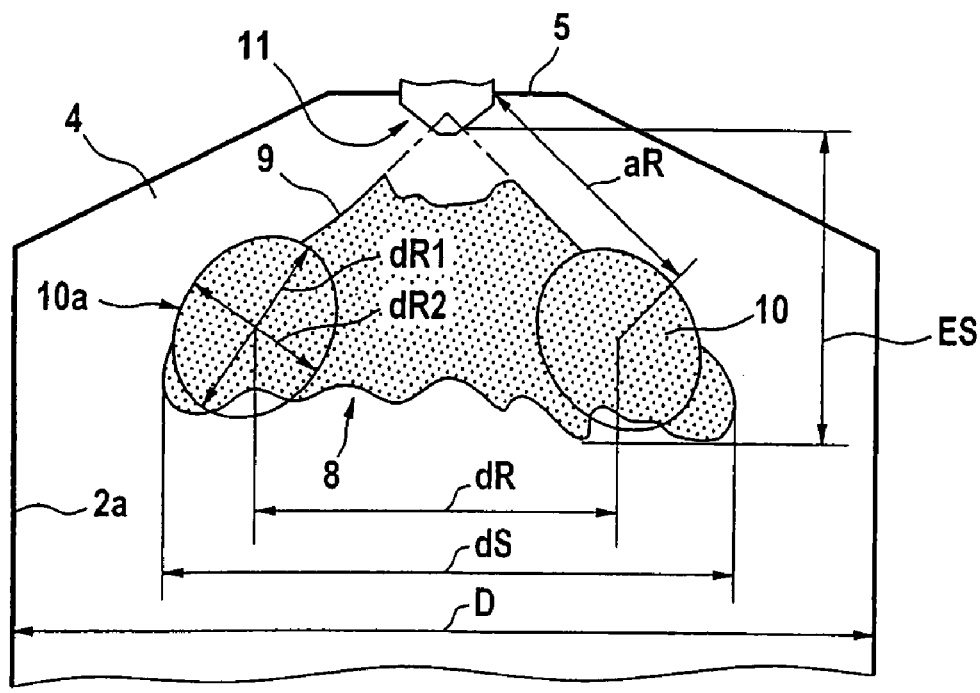
FIG. 2 is an enlarged sectional illustration of a combustion space of the direct-injection spark-ignition internal combustion engine according to FIG. 1.

FIG. 2 shows diagrammatically an enlarged combustion space to illustrate the formation of the boundary vortex 10 in the combustion space 4 at an ignition time point. The hollow fuel cone 8 emerging from the injection nozzle 11 impinges onto compressed combustion air in the combustion space 4. In order to depict a fuel jet structure according to FIG. 2, the injection operation by means of the injection nozzle 11 according to the invention is recorded during the injection of gasoline fuel or n-heptane under engine operating conditions within a pressure chamber which is filled with gaseous nitrogen under pressure. Alternatively, the pressure chamber may be filled with air. During fuel injection, according to FIG. 2, a jet structure arises in which a boundary vortex 10 is formed on the surface area of the injected hollow cone 8. When the injection jet or the hollow cone 8 is illuminated by a light source by the transmitted-light or backlight method, then, at an injection pressure of about 180 to 220 bar, in particular at 200 bar, and with an absolute pressure in the injection chamber of about four to eight bar, in particular at six bar, the jet pattern illustrated in FIG. 2 arises when a recording is made at an ignition time point. These conditions correspond to the combustion space conditions at the injection time point which prevail when the internal combustion engine 1 according to the invention is in operation. By means of the light source, a backlight image is generated by the injected jet with a camera and is recorded by the camera at a discrete time point.

According to an advantageous exemplary embodiment, the internal combustion engine 1 is operated in such a way that it is operated in the lower and medium rotational speed and load range in the stratified charge mode and in the upper rotational speed and load range in the homogeneous charge mode. The invention is suitable particularly for internal combustion engines with a displacement of between two and seven liters, preferably of between three and six liters. Furthermore, bore diameters D of between 85 cm and 100 cm are preferred. In this case, an outwardly opening injection nozzle 11 is used, by means of which a hollow fuel cone 8 with an angle α of between 80° and 90° is generated. In a stratified charge mode, a boundary vortex 10 with a mean diameter dmR is formed in the case of a fuel injection pressure of about 180 to 220 bar when the back pressure in the combustion space 4 amounts at the time point of fuel injection to between 10 bar and 16 bar. According to the invention, the mean diameter dmR can be determined from a maximum diameter dR1 and a minimum diameter dR2 of an ellipse 10a. Both the two diameters and the boundary vortex 10 are bordered by the ellipse 10a. The mean diameter dmR=((dR1+dR2)/2) is composed in each case of half of the two oval diameters. The mean diameter dmR is equal to half the sum of the maximum and the minimum diameter. According to the invention, the internal combustion engine is designed in such a way that, at the ignition time point, a ratio dmR/D of the mean vortex diameter dmR to the bore diameter D is in a range of between 0.08 and 0.2 or of between 0.1 and 0.12. As a result, in the boundary vortex 10, a fuel distribution coordinated with the cylinder bore diameter is achieved, which, according to the invention, makes it possible to have a sufficient quantity of ignitable mixture in the region of the electrodes.

For further optimizing the configuration of the boundary vortex 10 with a view to misfire-free combustion, the boundary vortex 10 has a boundary vortex center aR which corresponds to a distance between the fuel outlet orifice and an intersection point of maximum diameter dR1 and minimum diameter dR2. According to the invention, at the ignition time point, a ratio dmR/aR of the mean diameter dmR to the boundary vortex center aR lies in a range of between 0.25 and 1.5, preferably of between 0.5 and 1.1. This ensures reliable ignition at the ignition time point.

According to the invention, at the ignition time point, the hollow fuel cone 8 has a toroidal vortex diameter dR which corresponds to a circle within the toroidal or annular vortex 10. This circle corresponds to the profile of the boundary vortex centers aR. In order to achieve optimal ignition when the internal combustion engine is operating, a ratio dR/D of the toroidal vortex diameter dR to the bore diameter D lies in a range of between 0.2 and 0.4 or of between 0.25 and 0.35.

In order, furthermore, to ensure the formation of ignitable fuel/air mixture in the region of the electrodes 12, a maximum diameter dS of the fuel cloud or of the fuel jet amounts at the ignition time point to 0.35 to 0.65 times or to 0.45 to 0.55 times the bore diameter D. The maximum diameter dS includes a ring which surrounds the outermost regions of the boundary vortex 10. According to a further preferred embodiment of the invention, the recess 3a provided in the piston head has a recess diameter dm. To achieve beneficial combustion with as high efficiency as possible, at the ignition time point the maximum diameter dS of the fuel cloud or of the fuel jet amounts to 0.5 to 1.5 times or 0.8 to 1.2 times the recess diameter dm.

A further optimization of ignition is achieved according to the invention by means of a depth of penetration ES of the injection jet or of the hollow fuel cone 8, said depth of penetration being adapted according to the combustion space configuration. The depths of penetration ES correspond to a vertical distance between the fuel outlet orifice and the horizontal line which lies directly beneath the hollow fuel cone 8 at the ignition time point. The present invention provides such fuel injection in which, at the ignition time point, there is a ratio ES/D of the maximum depth of penetration ES of the hollow fuel cone 8 to the bore diameter D of 0.1 to 0.5 or of 0.2 to 0.3. It was shown that reliable ignition occurs within this ratio range. With the depth of penetration ES being coordinated with the cylinder bore 2a, the fuel is distributed in the boundary vortex 10 in such a way that a more rapid intermixing with the combustion air present in the combustion space 4 is achieved.

With the ratios stated, the best possible combustion is obtained and a pronounced toroidal vortex formation is achieved. In this case, the fuel particles are concentrated in the boundary region of the vortex 10 in such a way that more droplets remain in the boundary region. This provides for a larger contact surface with the combustion air and result in the formation of a boundary vortex 10 having a uniform ignitable fuel distribution.

What is claimed is:

1. An internal combustion engine (1), comprising
    at least one cylinder (2) including a piston (3) and a cylinder head (5), defining therebetween a combustion space (4),
    a spark plug (7) arranged in the cylinder bead so as to extend into the combustion space (4),
    an outwardly opening injection nozzle (11) arranged in the cylinder head (5) and having nozzle opening projecting into the combustion space (4) for the injection of a fuel jet in the form of a hollow cone (8) into the combustion space (4),
    the spark plug (7) being arranged outside the surface area (9) of the hollow fuel cone (8) generated by the injection nozzle, and having electrodes (12) projecting into a fuel boundary vortex (10), formed at the surface area (9) of the injected fuel jet,
    said cylinder (2) having a cylinder bore (2a) with a diameter (D) dimensioned such that
    at an ignition time point of the internal combustion engine (1) a ratio (dmR/D) of a mean diameter (dmR) of the fuel boundary vortex (10) to the bore diameter (D) is in a range of 0.08 to 0.2.

2. The internal combustion engine as claimed in claim 1, wherein the ratio dmR/d is between 0.1 and 0.12.

3. The internal combustion engine as claimed in claim 1, wherein, at the ignition time point, a ratio (dmR/aR) of the mean diameter (dmR) of the boundary vortex (10) to the boundary vortex center (aR) lies in a range of between 0.25 and 1.5.

4. The internal combustion engine as claimed in claim 3, wherein the ratio dmR/aR is between 0.5 and 1.1.

5. The internal combustion engine as claimed in claim 1, wherein the hollow fuel cone (8) has at the ignition time point a toroidal vortex diameter (dR), a ratio (dR/C) of the toroidal vortex diameter (dR) La the bore diameter (D) lying in a range of between 0.2 and 0.4.

6. The internal combustion engine as claimed in claim 5, wherein the ratio dR/D is between 0.25 and 0.35.

7. The internal combustion engine as claimed in claim 1, wherein the hollow fuel cone (8) has a maximum diameter (dS) of the fuel cloud and, at the ignition time point a ratio (dS/D) of the maximum diameter (dS) to the bore diameter (D) is in the range of 0.33 to 0.65.

8. The internal combustion engine as claimed in claim 7, wherein the ratio dS/D is 0.45 to 0.55.

9. The internal combustion engine as claimed in claim 1, wherein the piston (3) has a recess (3a) with a recess diameter (dm), at the ignition time point a ratio (dS/dm) of the maximum diameter (dS) of the fuel cloud to the recess diameter (dm) lying between 0.5 and 1.5.

10. The internal combustion engine as claimed in claim 9, wherein the ratio dS/dm is between 0.8 and 1.2.

11. The internal combustion engine as claimed in claim 1, wherein at the ignition time point, a ratio (ES/D) of the maximum, depth of penetration (ES) of the hollow fuel cone (8) to the bore diameter (D) amounts to 0.1 to 0.5.

12. The internal combustion engine as claimed in claim 11, wherein the ratio ES/D is 0.2 to 0.3.

* * * * *